United States Patent
Koyama

(10) Patent No.: US 7,176,971 B2
(45) Date of Patent: Feb. 13, 2007

(54) SOLID-STATE IMAGE PICKUP DEVICE AND ELECTRONIC INFORMATION APPARATUS

(75) Inventor: Eiji Koyama, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 623 days.

(21) Appl. No.: 10/355,535

(22) Filed: Jan. 31, 2003

(65) Prior Publication Data

US 2003/0146992 A1    Aug. 7, 2003

(30) Foreign Application Priority Data

Feb. 6, 2002    (JP) ............................. 2002-030011

(51) Int. Cl.
*H04N 3/14*    (2006.01)

(52) U.S. Cl. ...................... 348/308; 348/302

(58) Field of Classification Search ..................... None
See application file for complete search history.

(56) References Cited

U.S. PATENT DOCUMENTS 4,809,307 A * 2/1989 Sakaue et al. ............. 257/239
6,677,996 B1 * 1/2004 Chung et al. ............... 348/308
6,697,111 B1 * 2/2004 Kozlowski et al. ......... 348/302
6,833,869 B1 * 12/2004 Okamoto .................... 348/294
6,956,606 B2 * 10/2005 Mabuchi .................... 348/308

FOREIGN PATENT DOCUMENTS

JP        09-130681        5/1997
JP        10-050977        2/1998

* cited by examiner

*Primary Examiner*—David Ometz
*Assistant Examiner*—Luong T. Nguyen
(74) *Attorney, Agent, or Firm*—David G. Conlin; William J. Daley, Jr.; Edwards Angell Palmer & Dodge LLP

(57) ABSTRACT

A solid-state image pickup device is provided which includes an electric charge accumulation region capable of accumulating electric charges, a reset transistor having a first terminal and a second terminal, in which an electric charge discharge potential is applied to the first terminal and the second terminal is connected to the electric charge accumulation region, and a source follower circuit including a driver transistor having the same structure as the reset transistor. An electric charge accumulation voltage of the electric charge accumulation region can be set to the electric charge discharge potential through the reset transistor. An output voltage from the source follower circuit is the electric charge discharge potential.

18 Claims, 6 Drawing Sheets

SOLID-STATE IMAGE PICKUP DEVICE AND ELECTRONIC INFORMATION APPARATUS

BACKGROUND OF THE INVENTION

1. Field of the Invention

The present invention relates to a solid-state image pickup device, such as a CMOS-type solid-state image pickup device, a CCD-type solid-state image pickup device, and the like, for use in various cameras, such as, for example, video cameras, surveillance cameras, front-door intercom cameras, in-vehicle cameras, cameras for videophones, cameras for mobile telephones, and the like, camera systems using these cameras, or the like. The present invention also relates to an electronic information apparatus comprising the solid-state image pickup device.

2. Description of the Related Art

At present, CMOS-type solid-state image pickup devices generally used are provided with a diffusion layer having a floating potential, which is called a floating diode, on a semiconductor substrate. The diffusion layer converts incident light to electricity. Electric charges generated by this photoelectric conversion are converted to a voltage by the capacitance component of the PN junction of the diffusion layer. A signal component is then output depending on the voltage of the electric charge. Thereafter, by applying a reset pulse (reset control signal) to the gate of a reset transistor, unnecessary electric charges accumulated in the floating diode portion is discharged through the reset drain portion so as to reset the potential of electric charges accumulated in the floating diode portion to a predetermined reset voltage.

CCD-type solid-state image pickup devices comprise CCD pixels arranged one-or two-dimensionally on a semiconductor substrate. Electric charges generated by photoelectric conversion by each CCD pixel are transferred through an electric charge transfer section to an electric charge accumulation region having a floating potential. A signal component corresponding to the voltage of the electric charges accumulated in the electric charge accumulation region is output to an output circuit. Thereafter, by applying a reset pulse (reset control signal) to the gate of a reset transistor, unnecessary electric charges accumulated in the floating diode portion is discharged through the reset drain portion so as to reset the potential of electric charges accumulated in the floating diode portion to a predetermined reset voltage.

FIG. 3 is a circuit diagram showing a configuration of a unit pixel in a conventional CMOS-type solid-state image pickup device.

Each unit pixel comprises a select switch transistor 1, a reset transistor 2, a floating diode 3, and an amplification transistor 4. The CMOS-type solid-state image pickup device is provided with a plurality of unit pixels arranged in a matrix having rows and columns on a semiconductor substrate.

The select switch transistor 1 has a source connected to a column signal line 5, a drain connected to the source of the amplification transistor 4, and a gate connected to a row signal line 6. A select pulse is used to select the row signal line 6. The select switch transistor 1 connected to the selected row signal line 6 is then driven.

The reset transistor 2 has a source connected to an electric charge accumulation region N1, a drain connected to the application portion of a voltage reset drain (reset voltage), and a gate connected to a reset pulse signal line 7. A reset pulse is used to reset the electric charge accumulation voltage of the electric charge accumulation region N1 through the reset transistor 2.

The floating diode 3 comprises a PN junction portion, in which electric charges generated by photoelectric conversion are accumulated in the electric charge accumulation region N1 having a floating potential.

The amplification transistor 4 has a source connected to the drain of the select switch transistor 1, a drain connected to a power source voltage, and a gate (the control terminal) connected to the electric charge accumulation region N1. The amplification transistor 4 outputs a signal voltage amplified depending on an electric charge accumulation voltage corresponding to the amount of incident light which has been photoelectrically converted by the floating diode 3.

The image pickup device is provided with a plurality of column signal lines 5 (vertical signal lines) arranged in parallel to each other. A vertical select transistor (not shown) is used to select each column signal line 5 so that unit pixels on a corresponding column of the two-dimensional matrix are selected. The select pulse row signal line 6 and the reset pulse signal line 7 are provided for each row of the two-dimensional matrix of unit pixels.

FIG. 4 is a timing chart for explaining an operation of the CMOS-type solid-state image pickup device of FIG. 3.

When a reset pulse goes to a high level so that a positive voltage is applied to the gate of the reset transistor 2, a short circuit electrically occurs between the reset drain and the floating diode 3, and as a result, the potential of the electric charge accumulation region N1 of the floating diode 3 is fixed (reset) to the potential of the voltage reset drain.

Next, when the reset pulse goes to a low level, the electric charge accumulation region N1 of the floating diode 3 is potentially shut off from the voltage reset drain. In this case, when light enters the floating diode 3, electric charges are generated in proportion to the amount of the incident light and the electric charges are converted to a negative voltage. As a result, the potential of the electric charge accumulation region N1 of the floating diode 3 which has been reset to the voltage reset drain is gradually lowered.

After a predetermined exposure time, when a select pulse goes to a high level, the select switch transistor 1 of each unit pixel on a row is selected through the corresponding row signal line 6. A signal voltage corresponding to the difference in potential between the voltage reset drain and the floating diode 3 is output as a signal component through a selected column signal line 5. Thereafter, when a reset pulse goes to the high level again, the electric charge accumulation region N1 of the floating diode 3 is reset to the potential of the voltage reset drain. The above-described operation is carried out for each frame period (e.g., 30 ms).

In general, the high level of the above-described reset pulse and select pulse is the power source voltage, and the low level thereof is 0 V, where the power source voltage is assumed to be 3 V. The voltage of the reset drain is often the same as the power source voltage.

As the reset transistor 2, a depletion-type transistor is generally used, in which when the high level of a reset pulse applied to the gate is the power source voltage, conduction can be obtained between the drain (reset drain) having the power source voltage and the source (floating diode).

FIG. 5 is a graph showing a relationship between the gate voltage and the potential under the gate (channel portion) of a depletion type reset transistor.

In the above-described CMOS-type solid-state image pickup device, it is assumed that the power source voltage is 3 V, and the gate voltage of the reset transistor 2 is 3 V which is the same as the power source voltage. In this case, in order to completely reset the signal electric charge of the floating diode (electric charge accumulation region N1) by a reset operation, the potential under the gate of the reset transistor 2 is required to be higher (deeper) than 3 V (=the power source voltage) which is the potential of the floating diode and the reset drain.

In FIG. 5, the potential under the gate is higher (deeper) by a magnitude indicated by arrows than the gate voltage. Therefore, by short circuiting (conduction) between the source having a potential of 3 V and the drain, the electric charge accumulation region N1 of the floating diode 3 can be reset to the potential of the voltage reset drain. However, the reset transistor 2 has a characteristic, particularly threshold voltage, which varies according to fluctuations in manufacturing processes. Therefore, this variation needs to be taken into consideration.

FIGS. 6A to 6C show the potentials of the floating diode (assuming that no electric charge is accumulated in the electric charge accumulation region), the reset gate, and the reset drain of the reset transistor 2 when the threshold voltage of the reset transistor 2 is maximum, standard, and minimum, respectively.

When the threshold voltage of the reset transistor 2 goes to a high level, the potential of the reset gate is lowered (upward in FIG. 6) by a variation of the threshold voltage even if a voltage having the same value is applied to the gate. On the other hand, even if fluctuations in manufacturing processes are large to an extent that the threshold voltage of the reset transistor 2 is caused to be maximum, it is necessary to short circuit (conduction) between the floating diode and the reset drain in terms of potential so as to reset the potential of the floating diode. Therefore, taking into consideration variations in threshold voltage, a standard threshold voltage is designed such that even when the threshold voltage of the reset transistor 2 is maximum as shown in FIG. 6A, the potential level of the reset gate is equal to the potential level of the reset drain.

In the case of the standard threshold voltage, the potential of the reset gate is higher (downward in FIG. 6B) than the potential of the reset drain as shown in FIG. 6B.

On the other hand, as indicated by an arrow in FIG. 6C, when the threshold voltage of the reset transistor 2 is minimum, the amount of electric charges which can be accumulated in the floating diode 3 (the electric charge accumulation region N1) is minimum. As shown in FIG. 6A, the standard threshold voltage is designed such that when the threshold voltage of the reset transistor 2 is maximum, the potential level of the reset gate is equal to the potential level of the reset drain. In this case, for example, assuming that the variation in the threshold voltage of the reset transistor 2 is ±0.2 V, when the threshold voltage is minimum, the amount of electric charges which can be accumulated is reduced by a channel potential (0.4 V) two times the variation (±0.2 V) of the threshold voltage as compared to when the threshold voltage is maximum.

Thus, since the threshold voltage of the reset transistor 2 varies due to fluctuations in manufacturing processes, the amount of electric charges which can be stored in the electric charge accumulation region N1 is reduced by a channel potential two times the variation of the threshold voltage of the reset transistor 2.

To solve the above-described problem, the present inventors have proposed a solid-state image pickup device in Japanese Laid-Open Publication No. 9-130681 (entitled "Sold-state Image Pickup Device"), in which a diode device which is a transistor formed by the same process as that for the reset transistor (i.e., having the same structure as that of the reset transistor) and having diode connection, is provided on the same semiconductor substrate. In this device, the forward voltage of the diode device is used as a voltage applied to the gate of the reset transistor.

In this solid-state image pickup device, when the channel potential of the reset transistor varies according to the fluctuations of the manufacturing processes, the channel potential of the transistor contained in the above-described diode device also varies as does the reset transistor. Therefore, the forward voltage of the diode device also varies. The variation in the forward voltage of the diode device causes the voltage applied to the gate of the reset transistor to vary in a manner that cancels the variations in the channel potential. Therefore, even if a characteristic of the reset transistor varies, a desired reset operation can be constantly carried out, thereby making it possible to maintain the maximum amount of accumulated electric charges.

Further, the present inventors have proposed another solid-state image pickup device in Japanese Laid-Open Publication No. 2000-26589 (entitled "Sold-state Image Pickup Device"), in which the solid-state image pickup device further comprises a voltage generation circuit for maintaining the source potential of the reset transistor higher than the channel potential under the gate.

In the solid-state image pickup devices in the above-described publications, the gate of the reset transistor is connected to the gate of the transistor formed by the same process and having the same structure, and the connection point is externally supplied with a reset pulse through a capacitor. Thus, these solid-state image pickup devices require an external capacitor for the gate of the reset transistor. However, such an external capacitor has to be incorporated to the semiconductor substrate in order to reduce the size, weight, and cost of such a solid-state image pickup device.

This external capacitor needs to have a capacitance of about 50 pF in order to hold electric charges for one frame period (e.g., 30 ms). A considerable substrate area is required for providing such an about 50 pF capacitor on a semiconductor substrate, which is not practical. Considering the area occupied by this capacitor on the substrate, the capacitance is preferably within 10 pF. However, a capacitance having a capacitance of 10 pF or less cannot hold electric charges for one frame period (e.g., 30 ms).

SUMMARY OF THE INVENTION

According to one aspect of the present invention, a solid-state image pickup device comprises an electric charge accumulation region capable of accumulating electric charges, a reset transistor comprising a first terminal and a second terminal, wherein an electric charge discharge potential is applied to the first terminal and the second terminal is connected to the electric charge accumulation region, and a source follower circuit comprising a driver transistor having the same structure as that of the reset transistor. An electric charge accumulation voltage of the electric charge accumulation region can be set to the electric charge discharge potential through the reset transistor. An output voltage from the source follower circuit is the electric charge discharge potential.

In one embodiment of this invention, the driver transistor is fabricated by the same process as that for the reset transistor and having the same transistor structure as that of the reset transistor. The driver transistor has a control terminal, a first drive terminal, and a second drive terminal, and the control terminal is connected to the first drive terminal. An output voltage from the second terminal of the driver transistor is the output voltage of the source follower circuit.

In one embodiment of this invention, the source follower circuit further comprises a constant current source section connected to the second drive terminal of the driver transistor.

According to another aspect of the present invention, a solid-state image pickup device comprises a reset transistor comprising a control terminal, a first drive terminal, and a second drive terminal, wherein a reset control voltage is applied to the control terminal, a reset voltage is applied to the first drive terminal, and an electric charge accumulation voltage is applied to the second drive terminal, and the electric charge accumulation voltage is set to be the reset voltage through the reset transistor by the reset control voltage, a source follower circuit comprising a driver transistor fabricated by the same process as that for the reset transistor and having the same transistor structure as that of the reset transistor, wherein the driver transistor has a control terminal, a first drive terminal, and a second drive terminal, and the control terminal is connected to the first drive terminal, and a constant current source section connected to the second drive terminal of the driver transistor and the first drive terminal of the reset transistor. An output voltage generated by the source follower circuit is applied to the first drive terminal of the reset transistor.

In one embodiment of this invention, a voltage applied to the control terminal of the driver transistor is the same as the reset control voltage applied to the control terminal of the reset transistor.

In one embodiment of this invention, the constant current source section comprises a constant current source transistor having a first drive terminal connected to the second drive terminal of the driver transistor.

In one embodiment of this invention, the solid-state image pickup device further comprises a first constant current source control voltage supply section for outputting a variable voltage corresponding to an average output signal for a single frame as the control voltage applied to the control terminal of the constant current source transistor.

In one embodiment of this invention, the solid-state image pickup device further comprises a second constant current source control voltage supply section for outputting a variable voltage corresponding to an amount of electric charges generated by photoelectric conversion as the control voltage applied to the control terminal of the constant current source transistor.

In one embodiment of this invention, the solid-state image pickup device comprises one or more pixels on a substrate. Each pixel comprises a first photoelectric conversion section for photoelectrically converting incident light, a first electric charge accumulation region for generating the electric charge accumulation voltage by accumulating electric charges generated by the first photoelectric conversion section, the reset transistor, and the source follower circuit.

In one embodiment of this invention, the solid-state image pickup device comprises one or more pixels on a substrate. Each pixel comprises a second photoelectric conversion section for photoelectrically converting incident light, an electric charge transfer section for transferring electric charges generated by the second photoelectric conversion section, a second electric charge accumulation region for accumulating the electric charges transferred from the electric charge transfer section as the electric charge accumulation voltage, the reset transistor, and the source follower circuit.

According to another aspect of the present invention, an electric information apparatus comprises the above-described solid-state image pickup device.

Hereinafter, functions of the present invention will be described below.

According to the present invention, a source follower circuit for applying an electric charge discharge potential (reset voltage) to a reset transistor comprises a driver transistor which is formed on the same semiconductor substrate as that for the reset transistor with the same process as that for the reset transistor and has the same transistor structure as that for the reset transistor. The potential of the source of the output from the source follower circuit varies, following the input voltage.

When fluctuations in manufacturing processes cause the threshold voltage of the reset transistor to be high, the threshold of the driver transistor in the source follower circuit is also increased. In this case, the output voltage of the source follower circuit is reduced so that the reset drain voltage is lowered. Therefore, even when the increase in the threshold voltage of the reset transistor causes the potential of the reset gate portion to be lowered, conduction (short circuit) can be caused to occur between the photodiode portion and the reset drain portion of the reset transistor, so that the photodiode portion can be reset to the reset drain voltage.

Moreover, when the threshold voltage of the reset transistor is lowered, the threshold voltage of the driver transistor is also lowered. In this case, the output voltage of the source follower circuit is increased so that the reset drain voltage is increased. Therefore, even when the threshold voltage of the reset transistor is lowered, it is possible to prevent the amount of electric charges which can be accumulated from being reduced.

As is different from the solid-state image pickup devices disclosed in Japanese Laid-Open Publication Nos. 9-130681 and 2000-26589, it is not necessary to externally provide a capacitor for holding the voltage of a direct current which is added to the direct current voltage of a reset pulse which is applied to the gate of the reset transistor. Therefore, it is possible to reduce the size, weight, and cost of a solid-state image pickup device.

Thus, the invention described herein makes possible the advantages of providing a solid-state image pickup device in which even when fluctuations in manufacturing processes cause variations in characteristics of a reset transistor, a reset operation is performed in substantially an ideal state while maintaining the amount of accumulated electric charges, resulting in contribution to a reduction in size, weight, and cost; and an electronic information apparatus comprising the solid-state image pickup device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. It should be appreciated that CMOS-type solid-state image pickup devices are described below, though the present invention can be applied to CCD-type solid-state image pickup devices.

(Embodiment 1)

Figure 1:
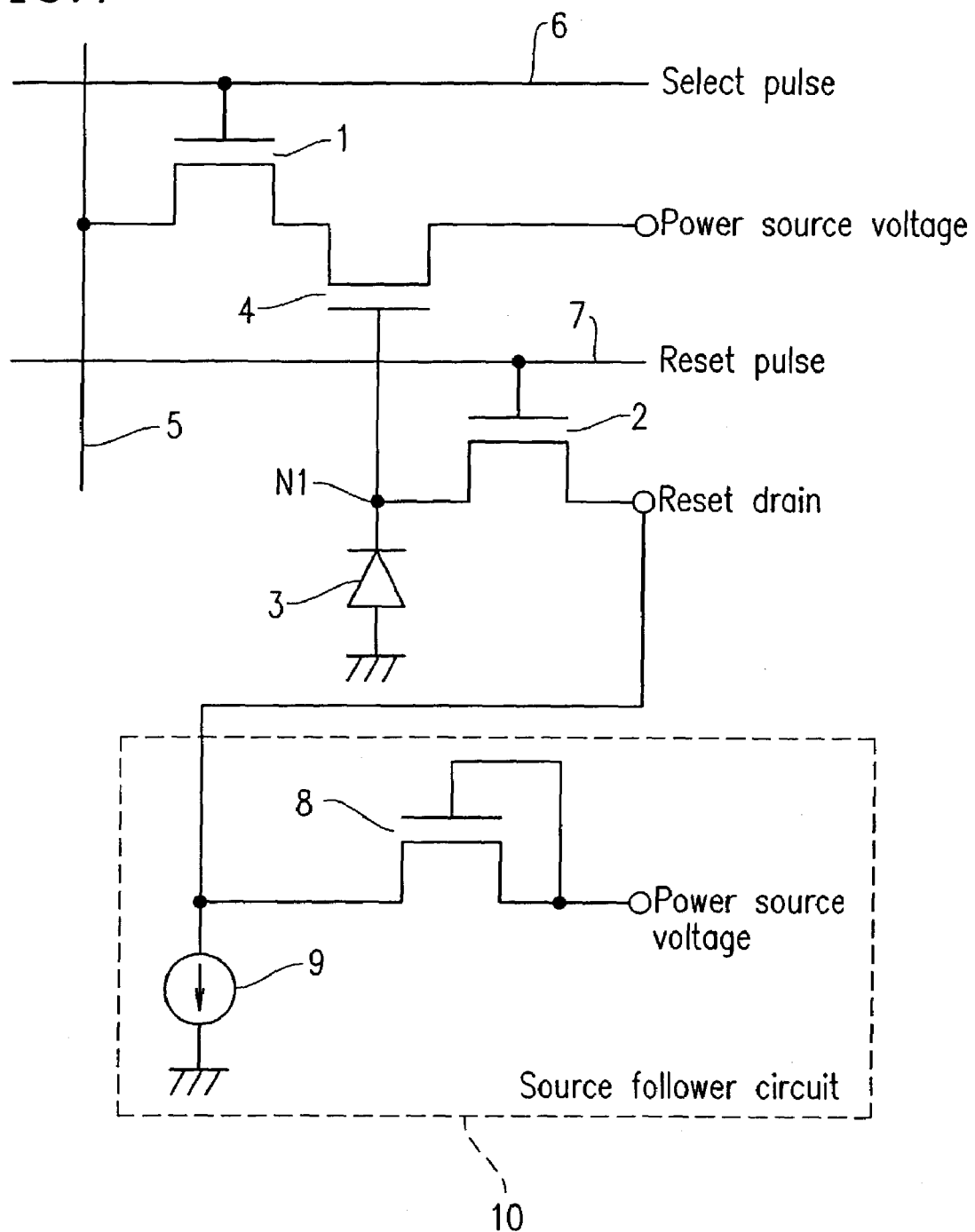
FIG. 1 is a circuit diagram showing a CMOS-type solid-state image pickup device according to Embodiment 1 of the present invention.
Figure 3:
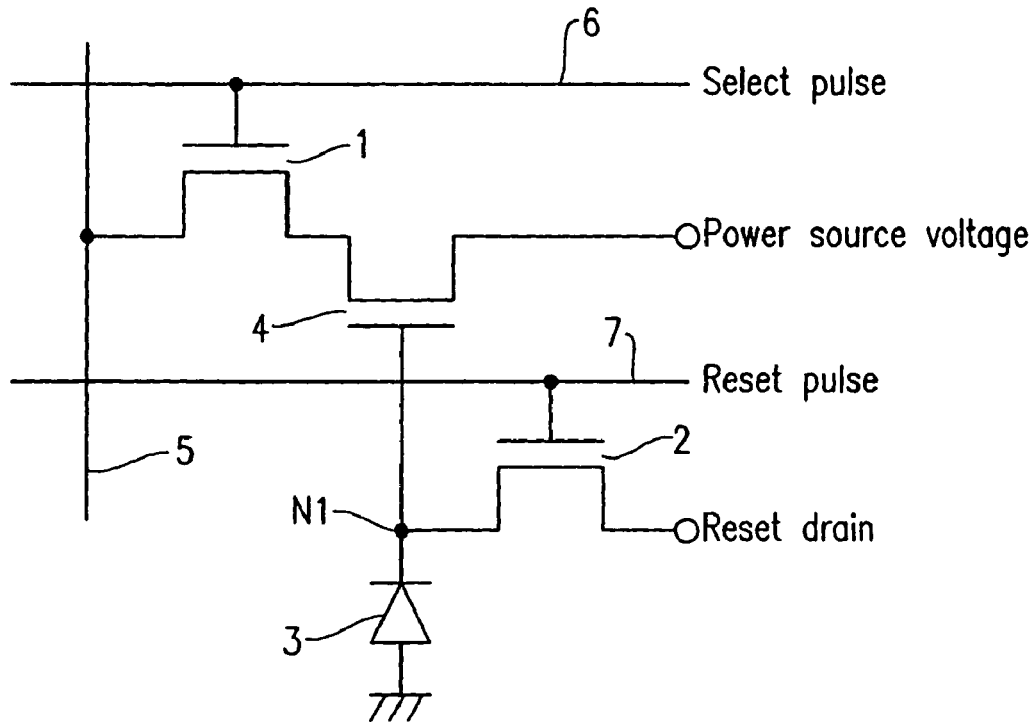
FIG. 3 is a circuit diagram showing a conventional CMOS-type solid-state image pickup device.

FIG. 1 is a circuit diagram showing a CMOS-type solid-state image pickup device according to Embodiment 1 of the present invention. Note that members having the same functions as those of corresponding members in FIG. 3 are indicated by the same reference numerals.

In FIG. 1, the solid-state image pickup device of Embodiment 1 is provided with a plurality of unit pixels, each of which comprises a select switch transistor 1, a reset transistor 2, a floating diode 3, an amplification transistor 4, and a source follower circuit 10 comprising a driver transistor 8 and a constant current source section 9. In the CMOS-type solid-state image pickup device, the unit pixels are arranged in a matrix having rows and columns on a semiconductor substrate.

As the reset transistor 2, a depletion-type transistor is used so that when the high level of a reset pulse applied to the gate thereof is a power source voltage, conduction (short circuit) can occur between the drain (reset drain portion) thereof having a reset drain voltage and the source (floating diode portion) thereof.

The driver transistor 8 has a gate (control terminal) and a drain (one control terminal) which are connected to the power source voltage. When the power source voltage is applied to the gate of the driver transistor 8, an output of the source follower circuit 10 is supplied as the reset drain voltage to the reset transistor 2. The source (the other drive terminal) of the driver transistor 8 is connected to a constant current source section 9, and this connection point is connected to the drain of the reset transistor 2. The driver transistor 8 is formed on the same semiconductor substrate by the same process as that for the reset transistor 2, having the same transistor structure as that of the reset transistor 2. A voltage applied to the gate of the driver transistor 8 is the same as the high level voltage of a reset pulse (reset control voltage) applied to the gate of the reset transistor 2.

The constant current source section 9 outputs a current. The value of the current (e.g., about 100 μA) is preferably sufficiently higher than the value of a current (typically 1 μA or less) generated by photoelectric conversion in the floating diode in order to minimize the influence of the current on the source follower circuit 10. A current I flowing through the source follower circuit 10, an input voltage Vin to the driver transistor 8, an output voltage Vout from the driver transistor 8, and a threshold voltage Vth of the driver transistor 8 has the following theoretical relationship:

$$I \propto (Vin - Vout - Vth)^2.$$

If the value of a current flowing through the constant current source section 9 is assumed to be 100 μA, $$I = 100 \, \mu A \propto (Vin - Vout - Vth)^2$$

where the floating diode 3 (photodiode) is shielded from light, and $$I = 101 \, \mu A \propto (Vin - Vout' - Vth)^2$$

where light enters the floating diode 3.

Therefore, the output voltage of the source follower circuit 10 is changed from Vout when the floating diode 3 is shielded from light to Vout' when light enters the floating diode 3. If the value of a current flowing through the constant current source section 9 is about 100 μA, variations in the output voltage can be reduced.

An operation of the above-described structure will be described below.

Figure 4:
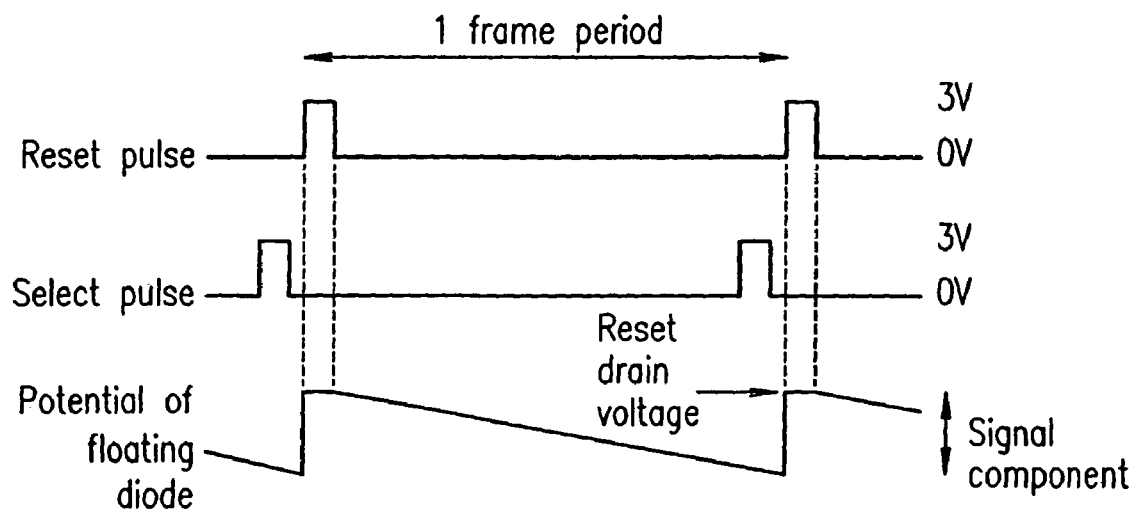
FIG. 4 is a timing chart for explaining an operation of the CMOS-type solid-state imaging device of FIG. 3.
Figure 5:
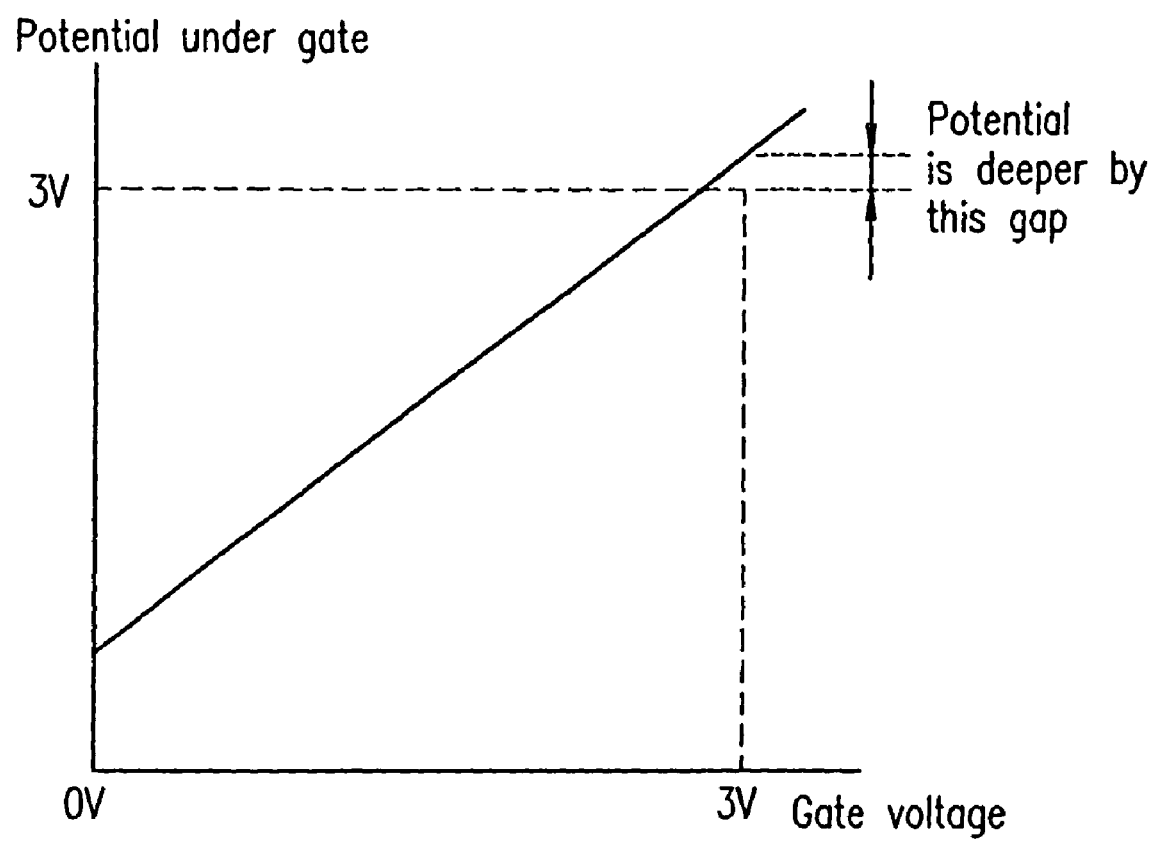
FIG. 5 is a circuit diagram showing a major configuration of a depletion type solid-state image pickup device.
Figure 6A:
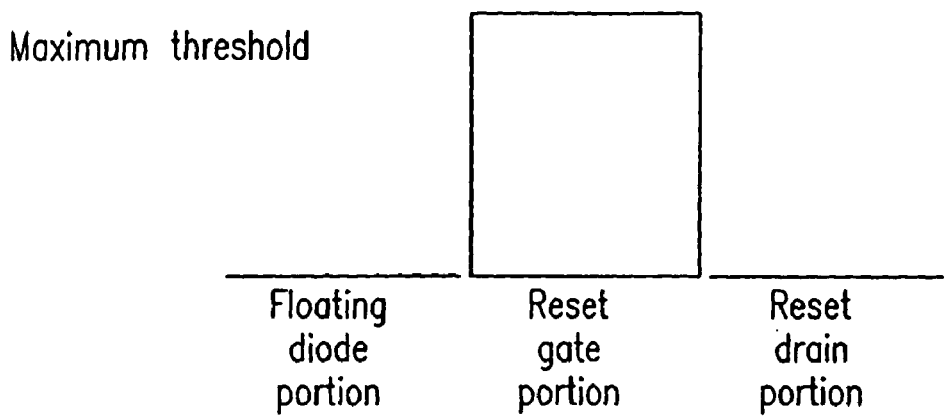
FIGS. 6A to 6C are diagrams showing the potentials of the floating diode portion, the reset gate portion, and the reset drain portion of a reset transistor when the threshold voltage of the reset transistor is maximum, standard, and minimum, respectively.
Figure 6B:
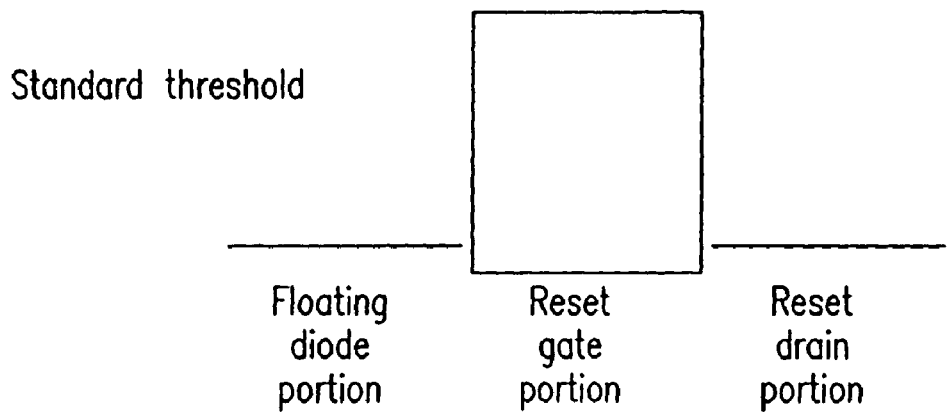
Figure 6C:
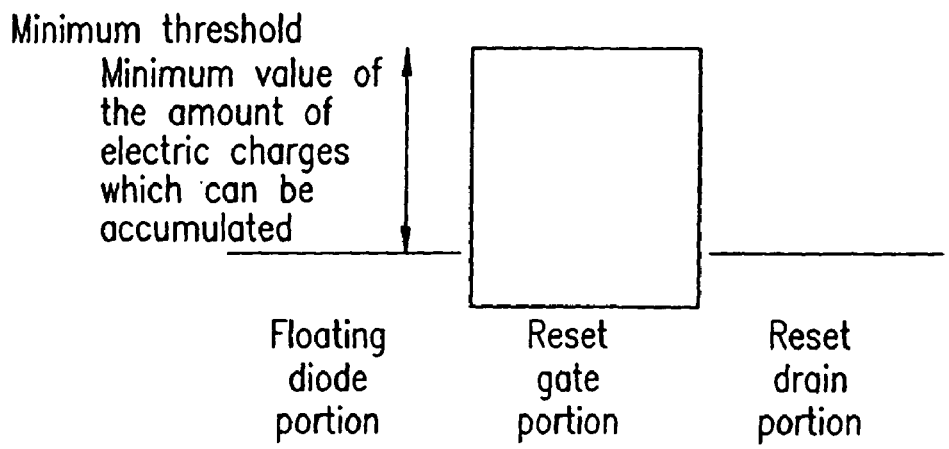

FIG. 4 is a timing chart for explaining an operation of the CMOS-type solid-state imaging device of FIG. 3.

Referring to FIG. 4, when a reset pulse goes to a high level at the beginning of one frame period, a positive voltage is applied to the gate of the reset transistor 2. As a result, conduction (short circuit) occurs between the reset drain portion of the reset transistor 2 and the floating diode 3, whereby the electric charge accumulation voltage of the electric charge accumulation region N1 of the floating diode 3 is fixed (reset) to the reset drain voltage (reset voltage).

Next, when the reset pulse goes to a low level, the reset drain portion of the reset transistor 2 is electrically shut off from the electric charge accumulation region N1 of the floating diode 3. In this case, if light enters the floating diode 3, electric charges are generated to an extent proportional to the amount of incident light. These electric charges are converted to a negative voltage. As a result, the potential of the electric charge accumulation region N1 of the floating diode 3 which has been reset to the reset drain voltage is gradually lowered.

When a select pulse goes to a high level at the end of one frame period, the select switch transistor 1 selects each unit pixel on a row along with a row signal line 6. A column signal line 5 is further selected. A signal component (amplification signal voltage) corresponding to the difference in potential (electric charge accumulation voltage) between the voltage reset drain and the floating diode 3 is output.

Thereafter, when the reset pulse goes to a high level again, the electric charge accumulation voltage of the electric charge accumulation region N1 of the floating diode 3 is reset to the reset drain voltage.

Such an operation is carried out for each frame period (e.g., 30 ms). Note that in Embodiment 1, the high level of the above-described reset pulse and select pulse is the power source voltage and the low level thereof is 0 V, where the power source voltage is 3 V.

In Embodiment 1, the reset drain voltage is supplied to the drain of the reset transistor 2 from the source follower circuit 10. The output voltage of the source follower circuit 10 (the voltage of the source of the driver transistor 8) is lower than the potential (channel potential) of the gate of the driver transistor 8 to which the power source voltage is applied. Since the driver transistor 8 has the same transistor structure as the reset transistor 2 contained in the pixel, the output voltage of the source follower circuit 10 is lower than the potential under the gate of the reset transistor 2. Therefore, if the power source voltage is applied as a reset pulse to the gate of the reset transistor 2 contained in the pixel, conduction (short circuit) occurs between the reset drain portion, which has the same potential as that of the output voltage of the source follower circuit 10, and the floating diode portion.

If large fluctuations in manufacturing processes cause the threshold voltage of the reset transistor 2 to be increased to (Vth+ΔVh), the potential under the gate of the reset transistor 2 to which the power source voltage is applied is lowered by a value corresponding to ΔVh. The reset drain voltage which is the voltage output from the source follower circuit 10 is also lowered by a value corresponding to ΔVh. The reason is as follows. As described above, when the threshold voltage of the reset transistor 2 is Vh, the current I flowing through the source follower circuit 10 is represented by:

$$I \propto (Vin-Vout-Vth)^2.$$

When the threshold voltage is increased by ΔVh, the current I' is represented by:

$$I' \propto (Vin-Vout'-(Vth+\Delta Vh))^2.$$

On the other hand, the constant current source section 9 causes the current I flowing through the source follower circuit 10 to be equal to I'. Therefore, $$Vout'=Vout-\Delta Vh.$$

Therefore, even when large fluctuations in manufacturing processes cause the threshold voltage of the reset transistor 2 to be increased to (Vth+ΔVh) and the potential under the gate of the reset transistor 2 is lowered, by applying the power source voltage as a reset pulse to the reset transistor 2 contained in the pixel, conduction (short circuit) is caused to electrically occur between the reset drain portion, which has the same potential (Vout−ΔVh) as that of the source follower circuit 10, and the floating diode portion. As a result, the photodiode can be reset to the reset drain voltage.

If large fluctuations in manufacturing processes cause the threshold voltage of the reset transistor 2 to be decreased to (Vth−ΔVh), the potential under the gate of the reset transistor 2 to which the power source voltage is applied is increased by a value corresponding to ΔVh. The reset drain voltage which is the voltage output from the source follower circuit 10 is also increased by a value corresponding to ΔVh. The reason is as follows. As described above, when the threshold voltage of the reset transistor 2 is Vh, the current I flowing through the source follower circuit 10 is represented by:

$$I \propto (Vin-Vout-Vth)^2.$$

When the threshold voltage is lowered by ΔVh, the current I' is represented by:

$$I' \propto (Vin-Vout'-(Vth-\Delta Vh))^2.$$

On the other hand, the constant current source section 9 causes the current I flowing through the source follower circuit 10 to be equal to I'. Therefore, $$Vout'=Vout+\Delta Vh.$$

Therefore, even when large fluctuations in manufacturing processes cause the threshold voltage of the reset transistor 2 to be lowered to (Vth−ΔVh) and the potential under the gate of the reset transistor 2 is increased, the potentials of the reset drain portion and the floating diode portion are high (Vout+ΔVh). Therefore, it is possible to prevent a defect that a decrease in the amount of electric charges which can be accumulated due to variations in the threshold voltage, which otherwise occurs conventionally.

When the power source voltage varies, the potential under the gate of the reset transistor 2 to which the power source voltage is applied also varies. In this case, the reset drain which is a voltage output from the source follower circuit 10 also varies following the variation. Therefore, even if the power source voltage varies, conduction (short circuit) can be caused between the reset drain portion and the floating diode portion to reset the photodiode portion to the reset drain voltage.

Moreover, in the solid-state image pickup device of Embodiment 1, the source follower circuit 10 is used to generate the reset drain voltage. As is different from the solid-state image pickup devices disclosed in Japanese Laid-Open Publication Nos. 9-130681 and 2000-26589, the source follower circuit 10 does not generate a current voltage which is added to a reset pulse which is applied to the reset transistor 2. It is not thus necessary to provide an external capacitor for holding such a current voltage. Therefore, it is not necessary to provide a capacitor on a semiconductor substrate, thereby making it possible to reduce the size, weight, and cost of solid-state image pickup devices.

(Embodiment 2)

Figure 2:
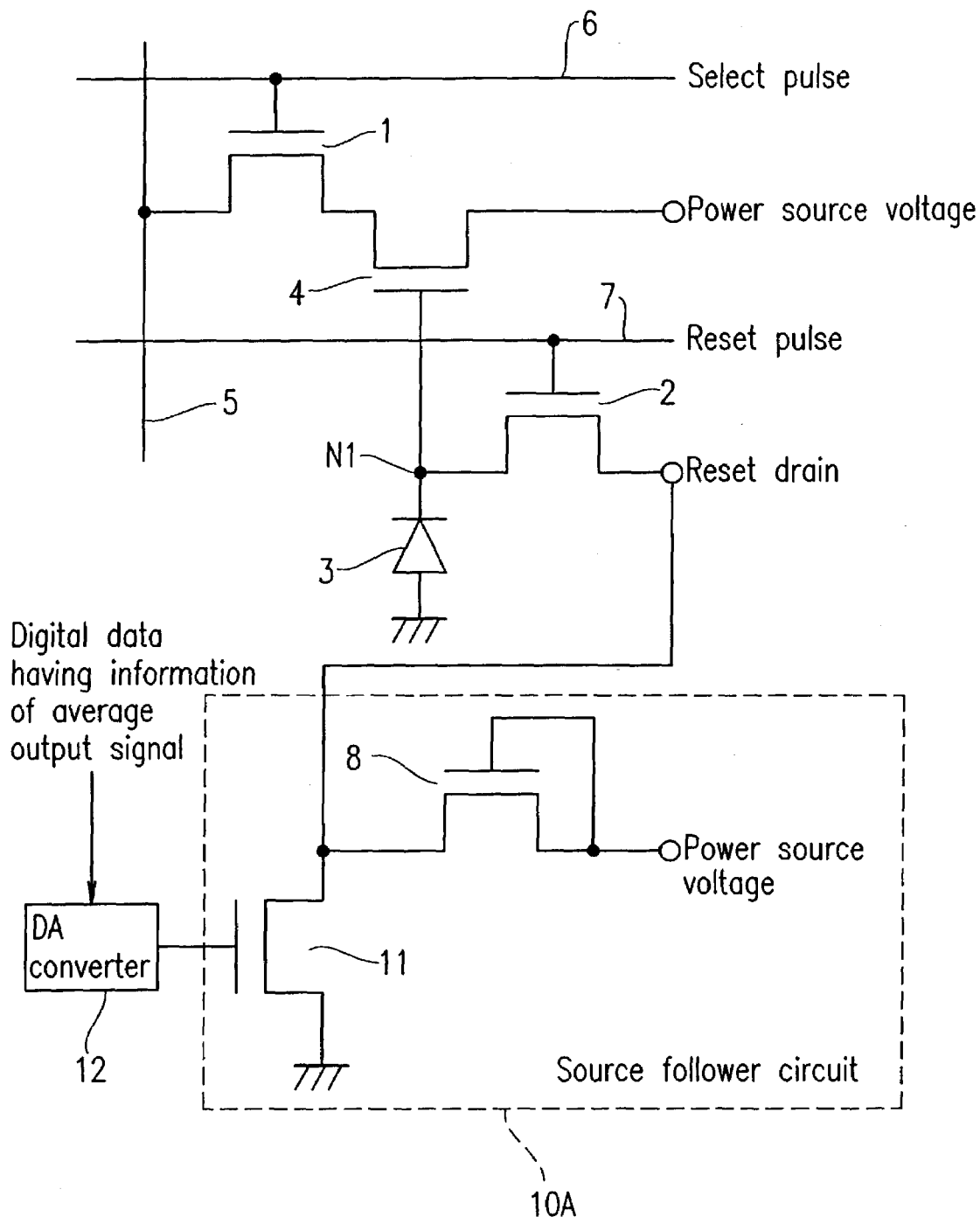
FIG. 2 is a circuit diagram showing a CMOS-type solid-state image pickup device according to Embodiment 2 of the present invention.

FIG. 2 is a circuit diagram showing a major configuration of a solid-state image pickup device according to Embodiment 2 of the present invention. Note that members having the same functions as those of corresponding members in FIG. 1 are indicated by the same reference numerals, and a description thereof is omitted.

The solid-state image pickup device according to Embodiment 2 is provided with a source follower circuit 10A comprising a driver transistor 8, and a constant current source transistor 11 having a drain (one drive terminal) connected to the source (the other drive terminal) of the driver transistor 8. The solid-state image pickup device according to Embodiment 2 is further provided with a DA converter 12 as a first constant current source control voltage supply section which outputs a variable voltage according to the average of output signals from one frame. This variable voltage is applied as a control voltage to the gate (control terminal) of the constant current source transistor 11.

The driver transistor 8 has the same transistor structure as that of a reset transistor 2, and is formed by the same process on the same substrate, as in Embodiment 1. The gate and the drain of the driver transistor 8 are connected to a power source voltage terminal. When the power source voltage is applied to the gate of the driver transistor 8, an output of the source follower circuit 10A is supplied as a reset drain voltage to the drain of the reset transistor 2. The source of the driver transistor 8 is connected to the drain of a constant current source transistor 11 and this connection point is connected to the drain of the reset transistor 2. The source of the constant current source transistor 11 is connected to the ground.

The gate of the constant current source transistor 11 is connected to the DA converter 12 so that a current flowing through the constant current source transistor 11 is controlled by the output voltage of the DA converter 12.

The DA converter 12 is supplied with digital data having the average of output signals for one frame from a signal processing portion (not shown) provided in the solid-state image pickup device or a signal processing portion (not shown) provided externally. The DA converter 12 outputs a high level of analog voltage when the average output signal is high or a low level of analog voltage when the average output signal is low.

Note that in Embodiment 2, a variable voltage corresponding to the average output signal for one frame is output as the control voltage which is applied to the control terminal of the constant current source transistor 11. The present invention is not so limited. A variable voltage corresponding to the amount of electric charges obtained by photoelectric conversion may be output. Specifically, the amount of electric charges obtained by photoelectric conversion is increased in proportion to the average output signal for one frame. In this case, by applying the output voltage of the DA converter 12 to the gate of the constant current source transistor 11, the amount of a current flowing through the constant current source transistor 11 is made large when the amount of electric charges obtained by photoelectric conversion is large, while the amount of a current flowing through the constant current source transistor 11 is made small when the amount of electric charges obtained by photoelectric conversion is small. Therefore, the amount of a current flowing through the constant current source transistor 11 can be controlled according to conditions for image pickup. Therefore, it is unnecessary that a predetermined large current (about 100 μA) as in Embodiment 1 is caused to constantly flow through the source follower circuit 10, thereby making it possible to reduce power consumption to a further extent.

As described above, in Embodiment 2, the DA converter 12 is used to cause a voltage, which is applied to the gate of the constant current source transistor 11, to be variable. Any other means can be used as long as a current flowing through a source follower circuit can be controlled according to the amount of electric charges obtained by photoelectric conversion.

As described above, according to the present invention, a source follower circuit for applying an electric charge discharge potential (reset voltage) to a reset transistor comprises a driver transistor which is formed on the same semiconductor substrate as that for the reset transistor with the same process as that for the reset transistor and has the same transistor structure as that for the reset transistor. Therefore, even when fluctuations in manufacturing processes cause the threshold voltage of the reset transistor or the power source voltage to vary, the variations can be followed by changing the voltage reset drain. Thereby, conduction (short circuit) can be caused to occur between the photodiode portion and the reset drain portion of the reset transistor, so that the photodiode portion can be reset to the reset drain voltage. Moreover, even when the threshold voltage of the reset transistor is lowered, it is possible to prevent the amount of electric charges which can be accumulated from being reduced.

As is different from the solid-state image pickup devices disclosed in Japanese Laid-Open Publication Nos. 9-130681 and 2000-26589, it is not necessary to externally provide a capacitor for holding the voltage of a direct current which is added to the direct current voltage of a reset pulse which is applied to the gate of the reset transistor. Therefore, it is possible to reduce the size, weight, and cost of a solid-state image pickup device.

Figure 7:
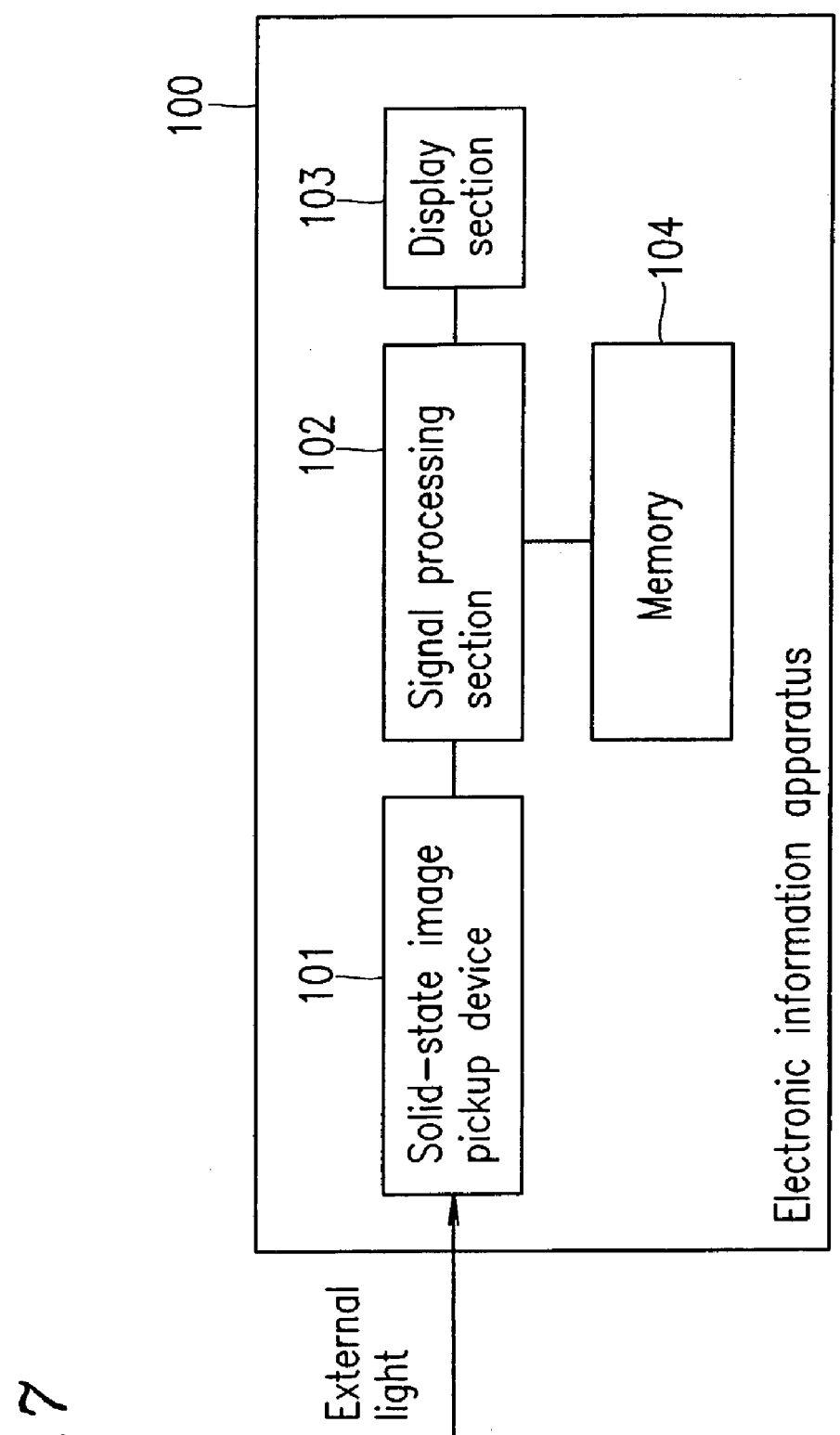
FIG. 7 is a block diagram showing a basic structure of an electronic information apparatus comprising the solid-state image pickup device of the present invention.

It should be appreciated that the solid-state image pickup device of the present invention can be easily incorporated into electronic information apparatuses, such as mobile telephones, cameras, and the like. In this case, the effects of the present invention can also be obtained. Referring to FIG. 7, an exemplary electronic information apparatus 100 is illustrated. This electronic information apparatus 100 comprises a solid-state image pickup device 101 according to the present invention, a signal processing section 102, a display section 103, and a memory 104. The solid-state image pickup device 101 picks up an image of an object as external light. Pixel data of the picked-up image is transferred as image data to the signal processing section 102 which performs various signal processes for the image data. The processed image data is output on the display section 103. The signal processing section 102 stores the processed image data in the memory 104, and reads the image data from the memory 104 as required and outputs the data to the display section 103. Thus, even when the solid-state image pickup device 101 is applied to the electronic information apparatus 100, a reset operation can be performed in substantially an ideal situation and the amount of electric charges can be maintained even if variations in the characteristics of a reset transistor occur due to fluctuations in manufacturing processes.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state image pickup device, comprising:
   an electric charge accumulation region capable of accumulating electric charges;
   a reset transistor comprising a first terminal and a second terminal, wherein an electric charge discharge potential is applied to the first terminal and the second terminal is connected to the electric charge accumulation region; and
   a source follower circuit comprising a driver transistor having the same structure as that of the reset transistor, wherein an electric charge accumulation voltage of the electric charge accumulation region can be set to the electric charge discharge potential through the reset transistor,
   an output voltage from the source follower circuit is the electric charge discharge potential, and
   the driver transistor has a control terminal, a first drive terminal, and a second drive terminal, and the control terminal is connected to the first drive terminal.

2. A solid-state image pickup device according to claim 1, wherein the driver transistor is fabricated by the same process as that for the reset transistor and an output voltage from the second terminal of the driver transistor is the output voltage of the source follower circuit.

3. A solid-state image pickup device according to claim 2, wherein the source follower circuit further comprises a constant current source section connected to the second drive terminal of the driver transistor.

4. A solid-state image pickup device according to claim 3, wherein the constant current source section comprises a constant current source transistor having a first drive terminal connected to the second drive terminal of the driver transistor.

5. A solid-state image pickup device according to claim 4, further comprising:
   a first constant current source control voltage supply section for outputting a variable voltage corresponding to an average output signal for a single frame as the control voltage applied to the control terminal of the constant current source transistor.

6. A solid-state image pickup device according to claim 4, further comprising:
   a second constant current source control voltage supply section for outputting a variable voltage corresponding to an amount of electric charges generated by photoelectric conversion as the control voltage applied to the control terminal of the constant current source transistor.

7. A solid-state image pickup device according to claim 1, wherein a voltage applied to the control terminal of the driver transistor is the same as the reset control voltage applied to the control terminal of the reset transistor.

8. A solid-state image pickup device according to claim 1, comprising one or more pixels on a substrate, wherein each pixel comprises:
   a first photoelectric conversion section for photoelectirically converting incident light;
   a first electric charge accumulation region for generating the electric charge accumulation voltage by accumulating electric charges generated by the first photoelectric conversion section;
   the reset transistor; and
   the source follower circuit.

9. A solid-state image pickup device according to claim 1, comprising one or more pixels on a substrate, wherein each pixel comprises:
   a second photoelectric conversion section for photoelectirically converting incident light;
   an electric charge transfer section for transferring electric charges generated by the second photoelectric conversion section;
   a second electric charge accumulation region for accumulating the electric charges transferred from the electric charge transfer section as the electric charge accumulation voltage;
   the reset transistor; and
   the source follower circuit.

10. A solid-state image pickup device, comprising:
    a reset transistor comprising a control terminal, a first drive terminal, and a second drive terminal, wherein a reset control voltage is applied to the control terminal, a reset voltage is applied to the first drive terminal, and an electric charge accumulation voltage is applied to the second drive terminal, and the electric charge accumulation voltage is set to be the reset voltage through the reset transistor by the reset control voltage;
    a source follower circuit comprising: a driver transistor fabricated by the same process as that for the reset transistor and having the same transistor structure as that of the reset transistor, wherein the driver transistor has a control terminal, a first drive terminal, and a second drive terminal, and the control terminal is connected to the first drive terminal; and a constant current source section connected to the second drive terminal of the driver transistor and the first drive terminal of the reset transistor,
    wherein an output voltage generated by the source follower circuit is applied to the first drive terminal of the reset transistor.

11. A solid-state image pickup device according to claim 10, wherein the constant current source section comprises a constant current source transistor having a first drive terminal connected to the second drive terminal of the driver transistor.

12. A solid-state image pickup device according to claim 11, further comprising:
    a first constant current source control voltage supply section for outputting a variable voltage corresponding to an average output signal for a single frame as the control voltage applied to the control terminal of the constant current source transistor.

13. A solid-state image pickup device according to claim 11, further comprising:
    a second constant current source control voltage supply section for outputting a variable voltage corresponding to an amount of electric charges generated by photoelectric conversion as the control voltage applied to the control terminal of the constant current source transistor.

14. A solid-state image pickup device according to claim 10, wherein a voltage applied to the control terminal of the driver transistor is the same as the reset control voltage applied to the control terminal of the reset transistor.

15. A solid-state image pickup device according to claim 10, comprising one or more pixels on a substrate, wherein each pixel comprises:
    a first photoelectric conversion section for photoelectirically converting incident light;
    a first electric charge accumulation region for generating the electric charge accumulation voltage by accumulating electric charges generated by the first photoelectric conversion section;
    the reset transistor; and
    the source follower circuit.

16. A solid-state image pickup device according to claim 10, comprising one or more pixels on a substrate, wherein each pixel comprises:
    a second photoelectric conversion section for photoelectirically converting incident light;
    an electric charge transfer section for transferring electric charges generated by the second photoelectric conversion section;
    a second electric charge accumulation region for accumulating the electric charges transferred from the electric charge transfer section as the electric charge accumulation voltage;
    the reset transistor; and
    the source follower circuit.

17. An electric information apparatus, comprising a solid-state image pickup device according to claim 1.

18. An electric information apparatus, comprising a solid-state image pickup device according to claim 10.

* * * * *